hy(12) United States Patent
Akirav et al.

(10) Patent No.: US 8,468,128 B2
(45) Date of Patent: *Jun. 18, 2013

(54) SYNCHRONIZATION OF SEQUENTIAL ACCESS STORAGE COMPONENTS WITH BACKUP CATALOG

(75) Inventors: Shay H. Akirav, Petach-Tikva (IL); Evgeny Budilovsky, Yehud (IL); Elena Drobchenko, Raanana (IL); Aharon Lazar, Kiryat Ono (IL); Ofer Leneman, Kfar Saba (IL); Itay Maoz, Haifa (IL); Gil E. Paz, Yehud (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,482

(22) Filed: May 4, 2012

(65) Prior Publication Data

US 2012/0226660 A1 Sep. 6, 2012

Related U.S. Application Data

(63) Continuation of application No. 12/788,249, filed on May 26, 2010, now Pat. No. 8,266,102.

(51) Int. Cl.
*G06F 17/30* (2006.01)
(52) U.S. Cl.
USPC .......................................... 707/613; 707/645
(58) Field of Classification Search
USPC .......... 707/611, 613, 614, 624, 645, 999.202, 707/999.204, 625
See application file for complete search history.

(56) References Cited

U.S. PATENT DOCUMENTS

| 7,177,866 B2 | 2/2007 | Holenstein et al. |
| 2005/0149578 A1 | 7/2005 | Sustman et al. |
| 2006/0200623 A1 | 9/2006 | Gonzalez et al. |
| 2007/0255920 A1 | 11/2007 | Gold |
| 2008/0082310 A1 | 4/2008 | Sandorfi et al. |
| 2009/0006733 A1 | 1/2009 | Gold et al. |
| 2009/0089340 A1 | 4/2009 | Ohr et al. |
| 2010/0030818 A1 | 2/2010 | Cooper et al. |
| 2011/0173169 A1* | 7/2011 | Chandrasekaran et al. .. 707/695 |
| 2011/0252208 A1* | 10/2011 | Ali et al. ........................ 711/162 |
| 2011/0307736 A1* | 12/2011 | George et al. ................... 714/6.2 |

OTHER PUBLICATIONS

IBM, "Virtual Tape Library for HSM," IP.com No. IPCOM000189493D, Nov. 12, 2009, 2 pages.

* cited by examiner

*Primary Examiner* — Leslie Wong
(74) *Attorney, Agent, or Firm* — Griffiths & Seaton PLLC

(57) ABSTRACT

Subsequent to a storage operation performed on the source instance by a source component, a synchronization message is sent to a replicated component for the replicated instance. The synchronization message is stored locally in a persistent storage location associated with the source component along with an indicator representative of a time the storage operation was performed. Pursuant to receipt of the synchronization message by the replicated component, the replicated component is updated to a dirty state to indicate a lack of full synchronization between the source and replicated instances. Receipt of the synchronization message is acknowledged by the replicated component by sending a dirty state acknowledgement. If, during a subsequent recovery process, the dirty state is not yet cleared, the replicated component is deemed ineligible for participation in a full restoration operation.

8 Claims, 5 Drawing Sheets

SYNCHRONIZATION OF SEQUENTIAL ACCESS STORAGE COMPONENTS WITH BACKUP CATALOG

CROSS-REFERENCE TO RELATED APPLICATIONS

This application is a Continuation of U.S. patent application Ser. No. 12/788,249, filed May 26, 2012.

FIELD OF THE INVENTION

The present invention relates in general to computers, and more particularly to apparatus, method and computer program product embodiments synchronization of sequential access storage components with a backup catalog in a computing environment.

DESCRIPTION OF THE RELATED ART

Data storage systems may externalize various logical data storage entities, such as files, data objects, backup images, data snapshots or virtual tape cartridges. It is often required that such data storage entities be replicated from their origin site to remote sites. Replicated data entities enhance fault tolerance abilities and availability of data. Such fault tolerance and wide availability is increasingly demanded.

SUMMARY OF THE INVENTION

Replication of data, for example in computing environments implementing virtual tape cartridges, has become increasingly important in computing storage environments to provide backup and other functional benefits. In environments featuring virtual tape libraries (VTL's), for backup implementations that transfer the cartridges to a remote site remote site that is logically a different backup domain, there is a need to recover the backup catalog (database) and align the catalog with the remotely replicated cartridges. In this scenario, this process simplifies the synchronization, in case of disaster, the backup application database with the remotely available replicas of the original cartridges.

In current implementations as described above, however, there is not an efficient method to quickly ascertain which cartridges (or other storage units such as volumes in other implementations) are consistent with the source up to the time of the disaster, and are ready to use immediately. This is at least partly due to the fact that the data movement between source and replicated components are performed asynchronously. As a result of the asynchronous nature of the data transfer, there could be minutes to hours between the time the data change occurred (such as a cartridge change) until the change is fully stable and committed to the remote site. During this time, the source component (e.g., source cartridge) and the replicated component (e.g., replicated cartridge) are differing in data makeup, and therefore the backup catalog, which is unaware of the replication process, is not synchronized with the state of the replicated components in the remote site.

In case of a real disaster, for example, a system administrator may be required to undergo a lengthy trial and error process to determine which data units are fully consistent in order to recover its main site. In one implementation, for example, a backup job may contain dozens of cartridges that are referred to as a cartridge set. To successfully recover a data set, all cartridges must be consistent for a specific point in time, and contain the right data. In view of the foregoing, a need exists for a mechanism whereby source and replicated instances may be quickly and efficiently synchronized, and to determine which replicated components have undergone such synchronization to effect a full recovery in an efficient manner.

Accordingly, various embodiments for synchronization of source and replicated instances of sequential access storage components with a backup catalog in a computing environment are provided. In one embodiment, by way of example only, subsequent to a storage operation performed on the source instance by a source component, a synchronization message is sent to a replicated component for the replicated instance. The synchronization message is stored locally in a persistent storage location associated with the source component along with an indicator representative of a time the storage operation was performed. Pursuant to receipt of the synchronization message by the replicated component, the replicated component is updated to a dirty state to indicate a lack of full synchronization between the source and replicated instances. Receipt of the synchronization message is acknowledged by the replicated component to the source component by sending a dirty state acknowledgement. If, during a subsequent recovery process, the dirty state is not yet cleared, the replicated component is deemed ineligible for participation in a full restoration operation.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
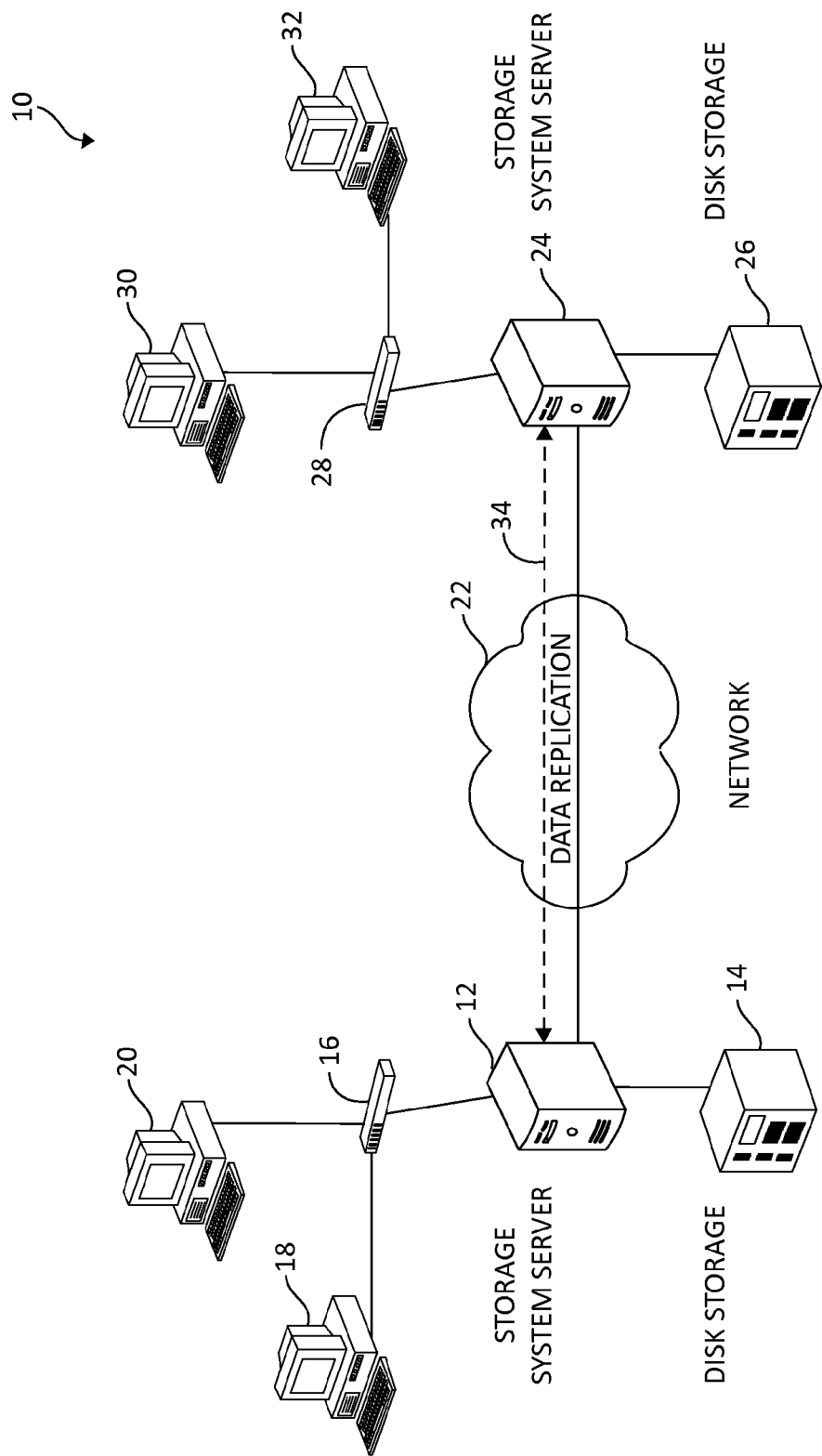
FIG. 1 illustrates an exemplary computing environment in which aspects of the present invention may be implemented.

Turning now to FIG. 1, exemplary architecture 10 of data storage systems (e.g., virtual tape systems) in a computing environment is depicted. Architecture 10 provides storage services to local hosts 18 and 20, and replicate data to remote data storage systems as shown. A local storage system server 12 in communication with a storage device 14 is connected to local hosts 18 and 20 over a network including components such as Fibre channel switch 16. Fibre channel switch 16 is capable, for example, of executing commands (such as small computer systems interface (SCSI) commands) for tape devices. The skilled artisan will appreciate that architecture 10 may include a variety of storage components. For example, storage devices 14 may include conventional hard disk drive (HDD) devices, or may include solid state drive (SSD) devices.

Local storage system server 12 is connected over network 22 to a remote storage system server 24. Remote server 24 communicates with a locally connected disk storage device 26, and with locally connected hosts 30 and 32 via another network and network component 28 such as Fibre channel switch 28. Network 22 may include a variety of network topologies, such as a wide area network (WAN), a local area network (LAN), a storage area network (SAN), and other configurations. Similarly, switches 16 and 28 may include other types of network devices.

Architecture 10, as previously described, provides local storage services to local hosts, and provides replicate data to the remote data storage systems (as denoted by data replication functionality using arrow 34). As will be described, various embodiments of the present invention and claimed subject matter may be implemented on architectures such as architecture 10. For example, in one embodiment, the disk storage device 14 may be part of a deduplicated storage system, storing deduplicated data entities. The deduplicated data entities may then undergo a data replication process 34 whereby the deduplicated data entities are replicated on the remote disk storage device 26.

There are several approaches for data replication, which may be used to design and implement replication mechanisms for deduplication storage systems. For deduplication systems that use mathematically strong digests (e.g., the Message Digest (MD) and Secure Hash Algorithm (SHA) hash function sets) to identify, store and retrieve data segments based on their contents, these digest values may be also used for a replication mechanism. Bandwidth reduction may be achieved by exchanging such digest values of the data to be replicated between the source and target systems, and furthermore the digest values of the replicated data may be used on the target side for deduplication processes. However, using such an approach would expose the replication process to a non-zero probability of inconsistency between the source and the replicated copies of the data, due to the reliance on the digest values rather than the actual data. Furthermore, there are deduplication systems that do not rely on mathematically strong digests, and for which implementing such an approach for replication may entail significant overhead in the storage and usage of such additional values.

Disk replication is generally based on propagating write operations from the source device to its target devices. Synchronous replication refers to a scenario where a write operation on the source device is considered complete only when all the target devices acknowledge the write operation. This approach guarantees complete consistency between the source and target devices. However, synchronous replication mechanisms typically reduce performance. Alternatively, asynchronous replication refers to a scenario where a write operation on the source device is considered complete as soon as the local operation is complete. Replication of the write operations is performed asynchronously in the background. This approach improves performance; with the caveat that the most recent write operations may be lost in case of failure of the source device.

The process of maintaining a consistency state of replicated data entities with respect to source entities should satisfy the following considerations. First, the state should be visible to the system administrator via a user interface (UI). Second, the state should be extractable via a command line interface (CLI) using a comma-delimited file. Third, the state of the replicated entity should be changed to "dirty" within a short period of time from the first commit of new data in the source component. Fourth, the replicated entities' consistency should be updated as true only after a full replication cycle has finished with no more outstanding changes in the replication communications channel.

The illustrated embodiments described, following, provide a novel approach for synchronizing source and replicated instances (for example, synchronization of cartridge states at source and remote sites), satisfying all of the above considerations for an efficient replication process while avoiding limitations of existing methodologies previously described. In one example, the mechanisms of the illustrated embodiments implement highly reliable messaging functionality enabling the synchronization of replicated entities with the backup catalog as will be further illustrated, following.

In one embodiment, every time a source component is updated (write, appended, or truncated at the source side), a synchronization message is sent within a short period of time or before the processing of the command locally (depending on the particular implementation), to the replicated component (remote system). The replicated component (e.g., remote cartridge metadata) is updated to a "dirty" state, meaning the replicated component is no longer fully synchronized with the source component. In the following description an exemplary synchronization message to update this state is referred to as a "DirtyBit" message.

A DirtyBit message need not be sent when the replicated component is already in a dirty state. This state stage need only occur when data is saved to stable storage and committed for by the storage device. At a subsequent time, when the replication operation has successfully finished with no additional changes to be replicated, the dirty state is cleared for the particular replicated component. With this mechanism in place, disaster recovery procedures may be performed immediately without the need for a system administrator or other user to review specific replicated content.

In one embodiment, the system administrator may issue a simple query to the destination system to retrieve the list of replicates (e.g., replicated cartridges) that are consistent with the source at the time the disaster occurred. With this information, it is easy for the source administrator to cross reference with the backup application catalog and determine which is the most updated backup job that may be fully recovered. Any job that has a replicated component in the dirty state is thereby not eligible for a full recovery. Such a mechanism alleviates the time-consuming trial and error phase previously required to determine which backup data set is fully synchronized with the backup catalog, and hastens the return to operation (RTO) time.

In one embodiment, the process for aligning replicate dirty states, while maintaining coherency and persistency of state changes, may proceed as follows. As a preliminary matter, when a replicated component is instantiated during the first replication job, its default state is dirty. As a first step, a source component (e.g., cartridge) at the source side is written to (updated forward or backwards). Next, data is committed by the host (i.e., SCSI flush). A DirtyBit message is created at the source and saved to local storage. The message is sent over the wire using the Asynchronous Replication lines. The dirty state is updated persistently in the destination system if needed. The DirtyBit message is acknowledged to the source system, which removes the message from the source system queue and memory file upon acknowledgment. Finally, every time a successful replication job is done and no more outstanding updates are available, the dirty state is turned off.

Taking the exemplary process described above further, in one embodiment, when the DirtyBit transfer request is initiated, the DirtyBit metadata may be first stored to a persistent storage file on or associated with the source component (along with a time stamp or a related indicator of when the metadata was created), and then added to a queue, such as a memory-based queue. The DirtyBit messages may then be sent after they are committed to stable storage on the source system to the designated destination system for processing. The destination side server may then invoke a DirtyBit request handler, which updates the dirty state on the replicated component. If the source system fails to send the request, or the dirty state update fails, then the request may be maintained in the control or source system to retry at a later time. Such a failure may be a result of a network failure or due to a malfunction of the destination system.

In case of a failure, one or more retries may be performed up to a user-defined timeframe. After this timeframe expires, the DirtyBit request may be discarded, and an alert may be raised to the user. In case of success, the pending request may be deleted from the persistent storage file, and removed from the queue.

Taking the exemplary process described above further, pursuant to a recovery, when a storage node experiences a power failure or a crash, its DirtyBit requests may be recovered from stable storage after reboot. During the initialization, the node may retrieve all requests stored in its persistent storage database, and try to resend them in the usual flow. The elements inside the persistent storage file may be protected by a cyclic redundancy check (CRC) in order to propagate any error in case of failure.

In some cases, since updates to the storage unit and the replication process can occur asynchronously, small updates and rapid replication processes may result in a scenario where data is processed at the source site (e.g., written), but not yet committed by the host, is already replicated successfully to the remote site. If, during the next host commit, the position of the last byte is behind the last successful replicated position, a new DirtyBit message may be created although the replicate data is up to date. In this scenario, a new replication job will not start and the dirty state will remain.

To address this scenario, the timestamp, or other related indicator stored with the DirtyBit metadata previously mentioned, may be examined. When the replicated component (destination side) determines that the timestamp is previous to the last successfully completed replication operation, the instant DirtyBit message may then be discarded, and the dirty state is left unchanged. This and the other processes described above are provided in further detail, following.

Figure 2:
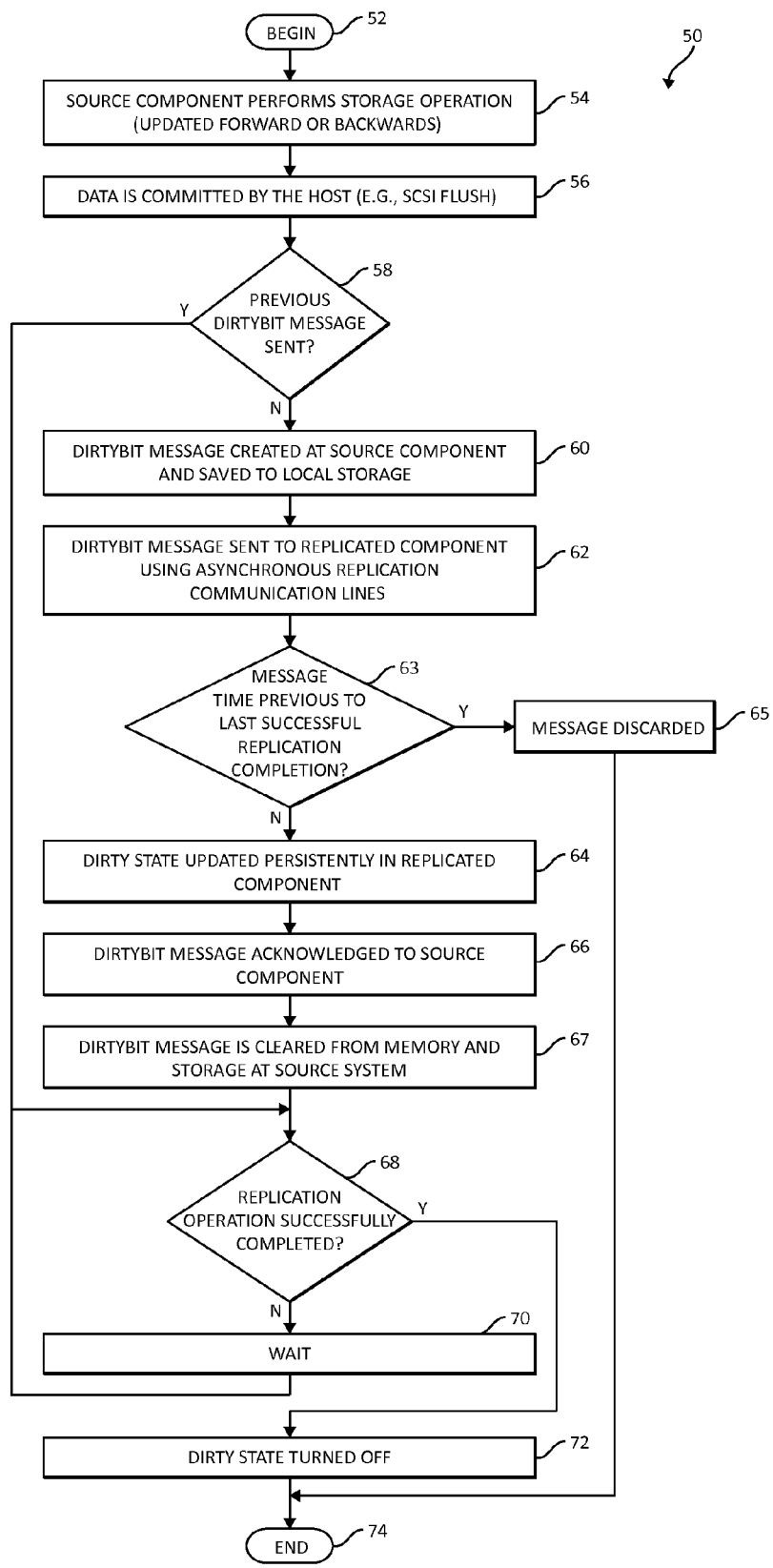
FIG. 2 illustrates an exemplary method for synchronization of sequential access storage components with a backup catalog in accordance with one embodiment of the present invention.
Figure 3:
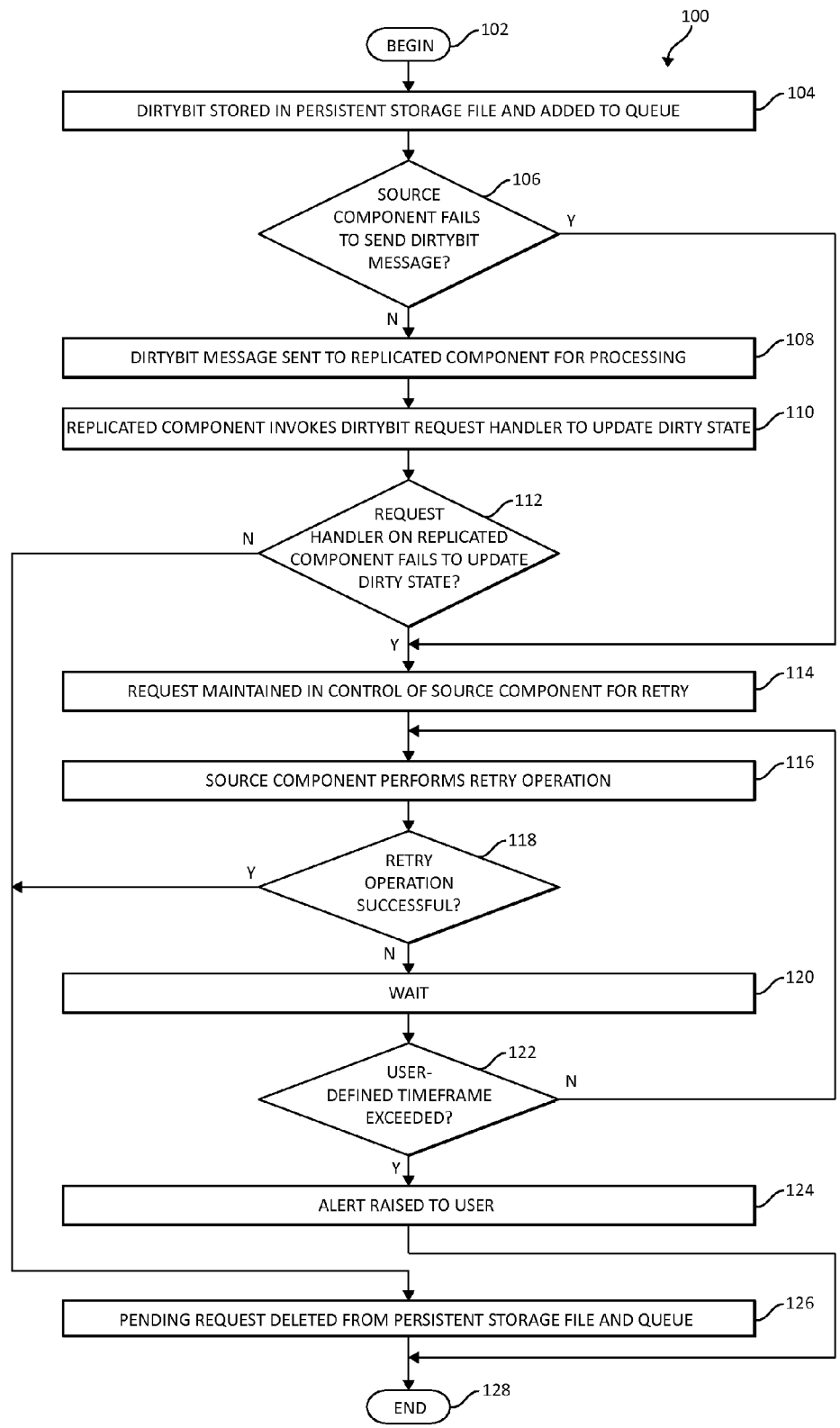
FIG. 3 illustrates an exemplary method for synchronization of sequential access storage components with a backup catalog including implementation and management of a "dirty-bit" message.
Figure 4:
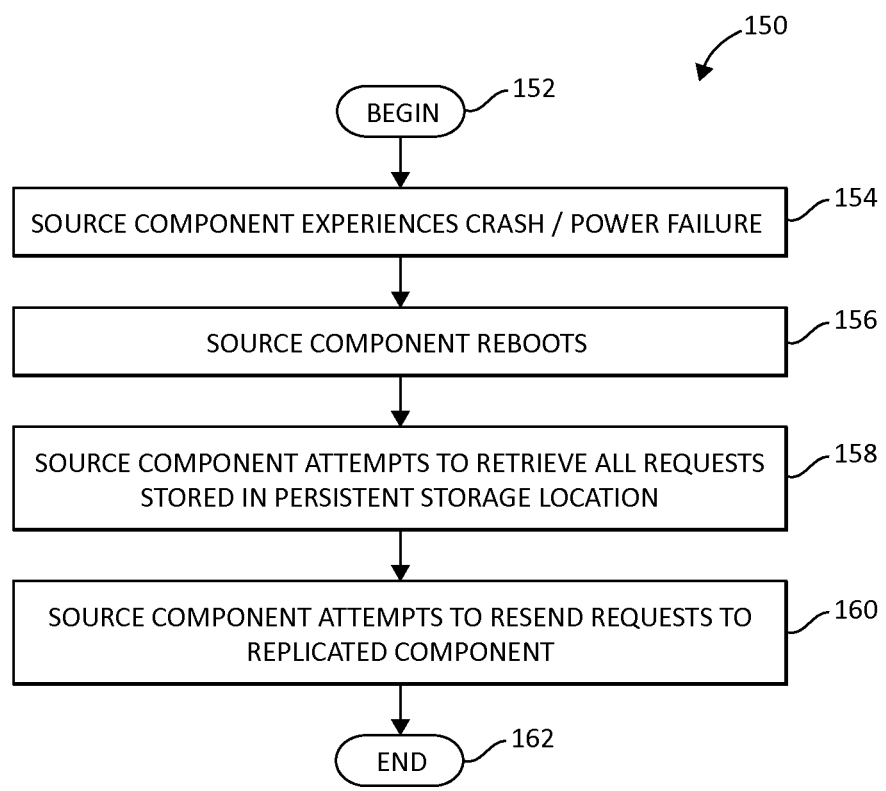
FIG. 4 illustrates an exemplary method for recovery according to one embodiment of the present invention.

Turning now to FIGS. 2, 3, and 4, exemplary methods 50, 100, and 150 are provided for synchronization of source and replicated instances with a backup catalog in a computing environment. As one skilled in the art will appreciate, various steps in the methods 50, 100, and 150 may be implemented in differing ways to suit a particular application. In addition, the described method may be implemented by various means, such as hardware, software, firmware, or a combination thereof operational on or otherwise associated with the computing storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), solid state devices such as solid state drives (SSDs) and other types of storage mediums.

Turning first to FIG. 2, method 50 begins (step 52) with the source component performing a storage operation (updated forwards or backwards) (step 54). The data is committed by the host (step 56). If a previous DirtyBit message was sent for the associated replicated component (step 58), then a new DirtyBit message is not provided, and the method moves to step 68. If this is not the case (again, step 58), then a DirtyBit message is created at the source component and saved a persistent storage database at the local site (step 60), including information indicating a time as to when the message was created (timestamp or other related indicator as previously described). The DirtyBit message is then sent to the replicated component, using the asynchronous communication lines (step 62).

If the timestamp or related indicator stored with the DirtyBit metadata to represent the time the DirtyBit metadata was created points to a creation time previous to the last successful completion of a replication operation (step 63), the DirtyBit message is discarded (step 65) and the dirty state remains unchanged. The method 50 then ends (step 74). This means that the replication operation completed faster than the sending of the DirtyBit message from the source to the replicated component, and a state change is unnecessary in this case.

Alternatively, if the message time is not determined to be previous to the last successfully completed replication operation (again, step 63), the dirty state of the replicated component is persistently updated (step 64), and the DirtyBit message is acknowledged to the source component (step 66). The DirtyBit message is then cleared from memory and storage at the source system (step 67). If the replication operation has not yet successfully completed (step 68), the method 50 waits until this is the case (step 70, returning to step 68). Once the operation successfully completes, the dirty state of the replicated component is turned off (step 72) indicating a full synchronization between the source and replicated instances and the backup catalog as previously described. The method 50 then ends (again, step 74).

Turning next to FIG. 3, an exemplary process flow of DirtyBit message handling is illustrated by method 100. Method 100 begins (step 102) with, following the creation of the DirtyBit message as previously described in step 58, FIG. 2, the storage of the DirtyBit metadata in a persistent storage file, and later, the addition of the DirtyBit data in a persistent storage file, and later, to a queue (step 104). Here again, an indicator as to when the DirtyBit information was created is also stored in the metadata. As previously indicated, if the source component fails to send the DirtyBit message information (step 106), the request is maintained in the control of the source component for one or more retries (step 114, and continuing as described below). If the DirtyBit message is sent successfully (step 108), the replicated component, the replicated component, once receipt of the DirtyBit message is confirmed, invokes a DirtyBit request handler to update the dirty state (step 110).

As previously indicated, if the request handler on the replicated component fails to update the dirty state (step 112), the request is maintained in the control of the source component for one or more retries (again, step 114). The source component or replicated component (as the case may be) performs the retry operation (step 116). If the retry operation is unsuccessful (step 118), the method 100 waits (step 120), and if a predefined timeframe is exceeded (step 122), an alert is raised to the user (step 124). If the retry operation is successful (again, step 118), the pending request is deleted from the persistent storage file and the queue (step 126). The method 100 then ends (step 128).

Turning finally to FIG. 4, an exemplary recovery process is illustrated by method 150. Method 150 begins (step 152) by the source component experiencing a power failure and/or crash (step 154). The source component then reboots (step 156). The source component attempts to retrieve all requests stored in its persistent storage database location (step 158). The source component then attempts to resend all of the requests to the replicated component (step 160). The method 150 then ends (step 162).

Figure 5:
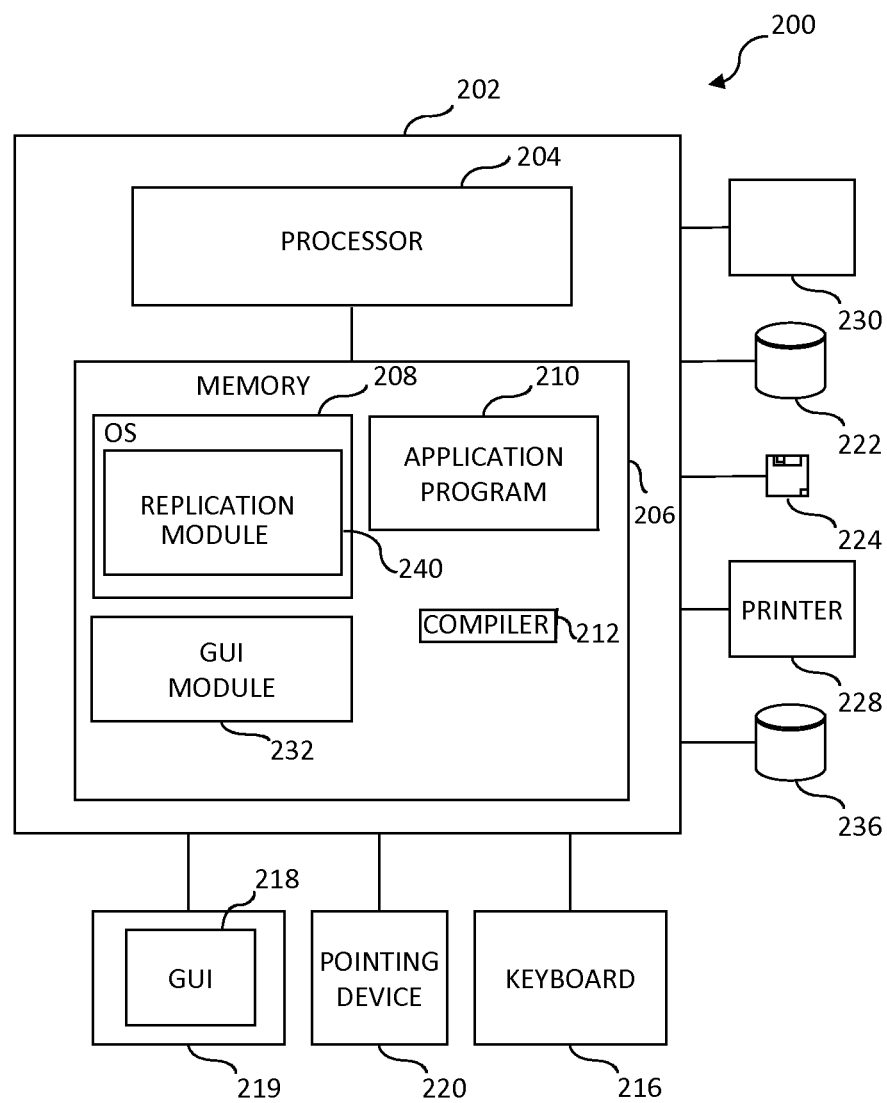
FIG. 5 illustrates an exemplary computing device including a processor device in a computing environment such as the computing environment shown in FIG. 1.

FIG. 5 hereafter provides an example of a portion of the computer environment 10 depicted in FIG. 1 in which the mechanisms of the foregoing embodiments may be implemented. It should be appreciated, however, that FIG. 5 is only exemplary and is not intended to state or imply any limitation as to the particular architectures in which the exemplary aspects of the various embodiments may be implemented. Many modifications to the architecture depicted in FIG. 6 may be made without departing from the scope and spirit of the following description and claimed subject matter.

FIG. 5 illustrates a portion 200 of an exemplary computer environment that can be used to implement embodiments of the present invention. A computer 202 comprises a processor 204 and a memory 206, such as random access memory (RAM). In one embodiment, storage system server 12 (FIG. 1) may include components similar to those shown in computer 202. The computer 202 is operatively coupled to a display 219, which presents images such as windows to the user on a graphical user interface 218. The computer 202 may be coupled to other devices, such as a keyboard 216, a mouse device 220, a printer 228, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the OS 208 facilitates the backup mechanisms. Although the GUI module 232 is depicted as a separate module, the instructions performing the GUI functions can be resident or distributed in the operating system 208, the application program 210, or implemented with special purpose memory and processors. OS 208 includes a replication module 240 which may be adapted for carrying out various processes and mechanisms in the exemplary embodiments previously described. Replication module 240 may be implemented in hardware, firmware, or a combination of hardware and firmware. In one embodiment, the replication module 240 may be embodied as an application specific integrated circuit (ASIC). As the skilled artisan will appreciate, functionality associated with the replication module 240 may also be embodied, along with the functionality associated with the processor 204, memory 206, and other components of computer 202, in a specialized ASIC known as a system on chip (SoC). Further, the functionality associated with the replication module (or again, other components of the computer 202) may be implemented as a field programmable gate array (FPGA).

As depicted in FIG. 6, the computer 202 includes a compiler 212 that allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, Ethernet card, wireless link or other device for communicating with other computers, e.g. via the Internet or other network.

Data storage device 222 is a direct access storage device (DASD) 222, including one or more primary volumes holding a number of datasets. DASD 222 may include a number of storage media, such as hard disk drives (HDDs), tapes, and the like. Data storage device 236 may also include a number of storage media in similar fashion to device 222. The device 236 may be designated as a backup device 236 for holding backup versions of the number of datasets primarily stored on the device 222. As the skilled artisan will appreciate, devices 222 and 236 need not be located on the same machine. Devices 222 may be located in geographically different regions, and connected by a network link such as Ethernet. Devices 222 and 236 may include one or more volumes, with a corresponding volume table of contents (VTOC) for each volume.

In one embodiment, instructions implementing the operating system 208, the computer program 210, and the compiler 212 are tangibly embodied in a computer-readable medium, e.g., data storage device 220, which may include one or more fixed or removable data storage devices 224, such as a zip drive, floppy disk, hard drive, DVD/CD-ROM, digital tape, flash memory card, solid state drive, etc., which are generically represented as the storage device 224. Further, the operating system 208 and the computer program 210 comprise instructions which, when read and executed by the computer 202, cause the computer 202 to perform the steps necessary to implement and/or use the present invention. For example, the computer program 210 may comprise instructions for implementing the grid set manager, grid manager and repository manager previously described. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). Accordingly, processor 204 may comprise a storage management processor (SMP). The program 210 may operate within a single computer 202 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for synchronization of source and replicated instances of sequential access storage components with a backup catalog in a computing environment by a processor device, comprising:
    subsequent to a storage operation performed on the source instance by a source component, sending a synchronization message to a replicated component for the replicated instance, wherein the synchronization message is stored locally in a persistent storage location associated with the source component along with an indicator representative of a time the storage operation was performed;
    pursuant to receipt of the synchronization message by the replicated component, updating the replicated component to a dirty state to indicate a lack of full synchronization between the source and replicated instances; and
    acknowledging receipt of the synchronization message by the replicated component to the source component by sending a dirty state acknowledgement;
    wherein if, during a subsequent recovery process, the dirty state is not yet cleared, the replicated component is deemed ineligible for participation in a full restoration operation.

2. The method of claim 1, further including creating the synchronization message on the source component.

3. The method of claim 1, further including, if the replicated component has previously sent the dirty state acknowledgment, withholding sending an additional synchronization message.

4. The method of claim 1, further including, subsequent to a completion of a replication operation, clearing the dirty state of the replicated component.

5. The method of claim 1, further including, subsequent to receipt of the synchronization message, storing the synchronization message in a persistent storage location associated with the replicated component.

6. The method of claim 1, further including querying the replicated component for a status of the dirty state using a request handler according to a predefined schedule.

7. The method of claim 6, further including, if at least one of querying the replicated component for the status of the dirty state and updating the replicated component to the dirty state fails, maintaining the at least one of the query and the update for subsequent retry by the source component.

8. The method of claim 7, further including retrying the one of the query and the update according to a user-defined timeframe, wherein:
   if the timeframe expires, the one of the query and the update is discarded and an alert is sent to the user, and
   if retrying the one of the query and the update is successful, the one of the query and the update is deleted from the source component.

\* \* \* \* \*